Aug. 24, 1965     R. S. WOLF     3,202,260
CONVEYOR
Filed Oct. 17, 1962     2 Sheets-Sheet 1
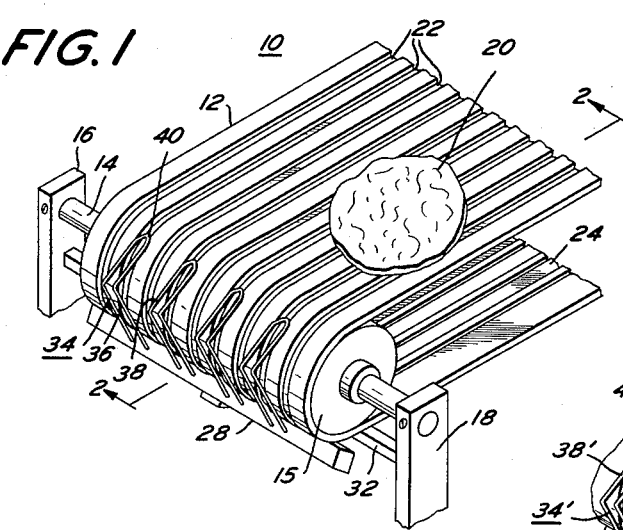
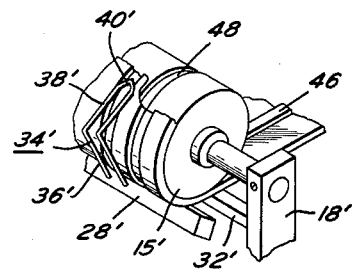
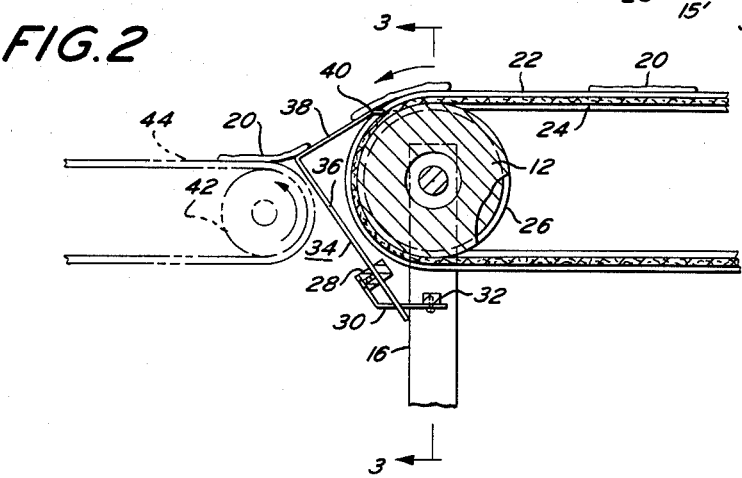
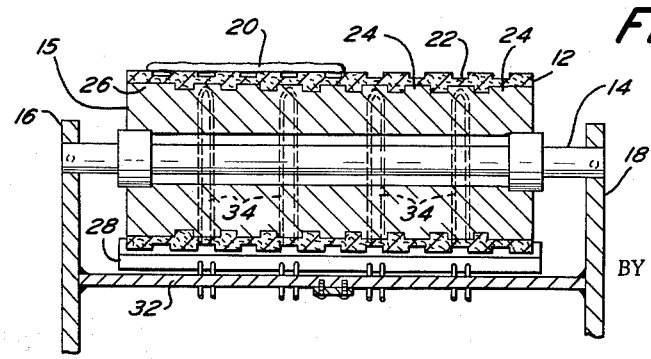
INVENTOR.
ROBERT S. WOLF
BY Arthur H. Seidel
ATTORNEY Aug. 24, 1965 R. S. WOLF 3,202,260
CONVEYOR Filed Oct. 17, 1962 2 Sheets-Sheet 2

INVENTOR.
ROBERT S. WOLF

BY Arthur H. Seidel

ATTORNEY

United States Patent Office 3,202,260
Patented Aug. 24, 1965

3,202,260
CONVEYOR
Robert S. Wolf, Philadelphia, Pa., assignor to Philadelphia Belting Co., Philadelphia, Pa., a corporation of Pennsylvania
Filed Oct. 17, 1962, Ser. No. 232,644
14 Claims. (Cl. 198—20)

In general, this invention relates to a new and improved conveyor belt system and, more particularly, to a conveyor belt for transporting meats and other articles of a tacky nature.

In the past, it has been very difficult to transfer bacon or other meats from one conveyor belt to another because of the tacky nature of the meat. That is, the meat adhered to the conveyor belt on which it was carried and would not easily be transported to the succeeding conveyor.

This problem was accentuated when the product to be conveyed was meat in thin slices or pastry dough in the form of thin sheets. In order to transport the thinly sliced meat from one conveyor to another, a stripping mechanism had to be devised. An additional problem arose with the inclusion of a stripping mechanism relating to the lateral shifting of the conveyor belt during its longitudinal movement creating a misalignment between the belt and the stripping mechanism.

In order to avoid the foregoing and other difficulties, it is the general object of this invention to provide a new and improved conveyor belt.

Another object of this invention is to provide a new and improved conveyor belt system for transporting tacky materials from one conveyor belt to another.

Another object of this invention is to provide a new and improved stripping mechanism for use with conveyor belts transporting thin tacky materials.

Another object of this invention is to provide a new and improved conveyor belt which will have no lateral movement during the operation of the conveyor belt.

Another object of this invention is to provide a new and improved conveyor belt system for transporting thin tacky materials in which the conveyor belt will remain aligned with a stripping mechanism during its entire operation.

Another object of this invention is to provide a new and improved conveyor belt system in which conveyor belts may be placed at angles of 90° with respect to each other when transferring material from one belt to the other.

Another object of this invention is to provide a new and improved stripping mechanism for use with conveyor belts which will enable thin tacky materials to be transported from one conveyor belt to another conveyor belt at extreme angles to the first conveyor belt.

Other objects will appear hereinafter.

For the purpose of illustrating the invention, there is shown in the drawings forms which are presently preferred; it being understood, however, that this invention is not limited to the precise arrangements and instrumentalities shown.

FIGURE 1 is a perspective view of a single conveyor belt and stripper mechanism utilizing the principles of the present invention.

FIGURE 2 is a cross sectional view of the conveyor belt of FIGURE 1 taken along lines 2—2 with a second conveyor shown in phantom.

FIGURE 3 is a cross sectional view of the conveyor belt of FIGURES 1 and 2 taken along lines 3—3 of FIGURE 2.

FIGURE 4 is a partial isometric view of a second embodiment of the present invention.

Figure 5:
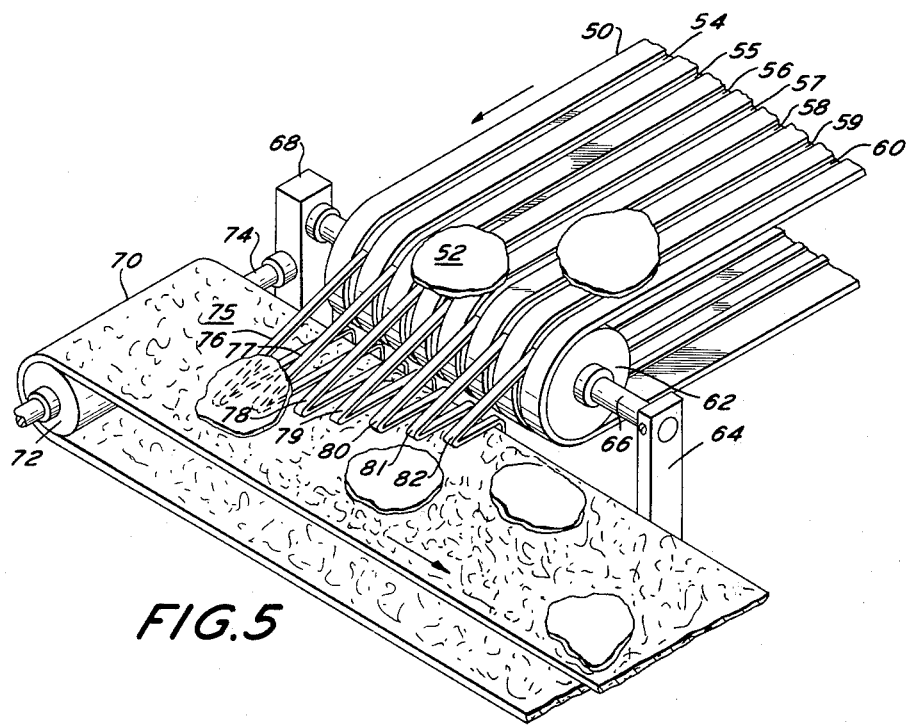
FIGURE 5 is a perspective view of another embodiment of the present invention in which two conveyor belts are placed at a 90° angle with respect to each other.

In FIGURE 1, there is shown a system for transporting thinly sliced tacky materials built in accordance with the principles of the present invention and generally designated by the numeral 10. In the drawings, like numerals indicate like elements.

The system 10 includes a conveyor belt 12 wrapped around a driven roll 15. The roll 15 has an axle 14 passing through the center thereof and is mounted for rotative movement on standards 16 and 18.

The conveyor belt 12 is adapted to transport thinly sliced materials 20. The material 20 may be sliced bacon, thin pastry dough, or other thinly sliced tacky materials. These materials would normally adhere to the conveyor belt and would be difficult to transport from one conveyor belt to another.

The conveyor belt 12 has a plurality of longitudinal grooves 22 extending the length thereof. The material 20 is wide enough to span at least two of said grooves 22.

The belt 12 additionally has a plurality of longitudinal grooves 24 on the inner surface thereof which cooperate with raised peripheral portions 26 on the roll 15 to lock the belt 12 against lateral movement. The interlocking of raised portions 26 and inner grooves 24 can best be seen with reference to FIGURE 3. The roll 15 has a plurality of raised portions 26 which extend in parallel spaced relationship around the periphery of the roll 15.

A resiliently mounted stripper block 28 is flexibly mounted through rods 30 to a support 32 fixedly connected between standards 16 and 18.

The stripper block 28 supports a plurality of stripper fingers 34. There are usually as many stripper fingers 34 as there are grooves 22 in the belt 12. However, for the purposes of clarity, only one stripper finger 34 is shown for every two grooves 22 in the belt 12.

The stripper finger 34 consists of a U-shaped wire bent at an angle to form a straight portion 36 and a transporting portion 38 at right angles thereto. The straight portion 36 terminates immediately above a second conveyor belt 44 adapted to be driven by a roll 42. The stripper finger 34 has its closed U portion bent over to form a groove insert 40. The groove insert 40 is adapted to fit within its respective groove 22.

The operation of the conveyor belt system of the present invention is as follows:

Bacon is sliced at a point above the conveyor belt 12 and dropped onto the conveyor belt. It is then transported toward the stripper fingers 34. When the bacon arrives at a point immediately above the groove inserts 40, it is forced off the conveyor belt 12 and onto the transporting portion 38 of the stripper fingers 34. Because the stripper fingers 34 are formed of a U-shaped wire, only line contact is made between the stripper fingers 34 and the bacon 20. Thus, there will be little surface for the bacon to adhere to and it will slide down the transporting portion 38 onto the next succeeding conveyor belt 44. In this manner, the bacon will be easily separated from one conveyor and fed to another.

The interlocking grooves on the bottom of the belt 12 prevent lateral movement of the belt. Any lateral movement of the belt 12 would cause misalignment of the belt with the stripper fingers 34. Since such lateral movement is impossible, the entire conveyor belt system will be operative for the purposes of this invention.

In FIGURE 4, there is shown a second embodiment of the present invention in which primed numerals are utilized to represent similar elements in FIGURES 1–3.

The conveyor belt 12' shown in FIGURE 4 has a single raised strip 46 located on its inner surface. The raised portion 46 cooperates with a single peripheral groove 48 on the roll 15' to prevent lateral movement of the conveyor belt 12'. By providing only a single raised portion, it is considerably easier to manufacture the belt 12. That is, it is not necessary to provide a multitude of longitudinal grooves in the belt 12. It is only necessary to secure a strip of material along the length of the inner surface of the belt 12. No special manufacturing processes need be utilized, and a considerable saving in cost of manufacture is effected. This is accomplished without a loss in efficiency. Additionally, by utilizing only a single groove and raised portion, misalignment problems between the roll 15 and the inner surface of the belt 12 have been eliminated. With the plurality of grooves, it is necessary to be extremely accurate and provide close tolerances for the grooves 24 and raised portions 26.

In FIGURE 5, there is shown another embodiment of the present invention in which material may be fed from one conveyor belt to another conveyor belt placed at an extreme angle such as 90° to the first conveyor belt.

In the embodiment shown in FIGURE 5, a first conveyor belt 50 is provided, similar in all respects to the conveyor belt 12 shown in FIGURE 1. The conveyor belt 50 is adapted to transport materials such as bacon, pastry or the like, and has a grooved exterior surface consisting of seven spaced grooves 54, 55, 56, 57, 58, 59 and 60.

The belt 50 is adapted to be mounted about a grooved roller 62 which maintains the belt 50 in alignment therewith in the same manner as was discussed previously with respect to conveyor belt 10. The roller 62 is mounted between supports 64 and 68 on an axle 66.

A second conveyor belt 70 is adapted to be mounted at a 90° angle with respect to belt 50. The belt 70 may be mounted at any angle desired in accordance with the needs of the conveyor belt system. The belt 70 is located below the conveyor belt 50 for the purposes to be hereinafter described.

Figure 6:
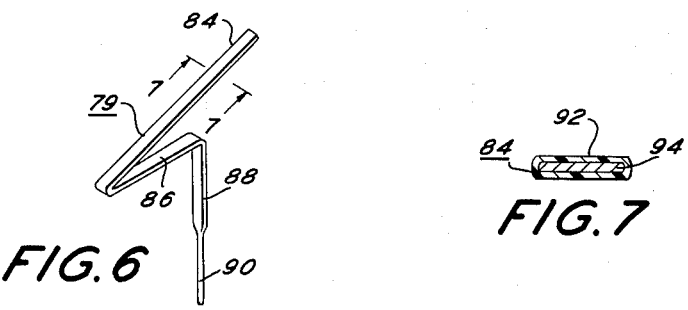
FIGURE 6 is a perspective view of a single stripper finger shown in FIGURE 5.

The belt 70 is mounted on roller 72 which has its axle 74 supported by standard 68 and another standard (not shown). A stripper finger assembly 75 is utilized to transfer the goods 52 from conveyor belt 50 to conveyor belt 70. The stripper finger assembly 75 consists of stripper fingers 76, 77, 78, 79, 80, 81 and 82 graduated in length so as to transfer the goods 52 to a position on the conveyor belt 70 similar to the position on the conveyor belt 50 from which it was fed. The stripper fingers 76–82 fit into the grooves 54–60 in the same manner as the assembly 34 in FIGURE 1 cooperated with the grooves 22. The stripper fingers 76–82 are all formed of a wire bent to form an inclined plane portion 84 which transfers the material from the higher conveyor 50 to the lower conveyor 70, a flat portion 86 which extends over the conveyor belt 70 from a side thereof, and a vertical extension 88 having a tapered portion 90 adapted to fit in the adjustable support for the stripper finger. This has been shown in FIGURE 6 wherein a typical stripper finger 79 has been shown in perspective.

The stripper finger 79 is preferably formed of a flat metal strip 94 on which has been placed a coating 92 of polytetrafluorethylene. This coating 92 is substantially frictionless and will allow the material 52 to pass from one conveyor to another with ease and rapidity.

Figure 7:
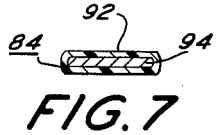
FIGURE 7 is a cross sectional view of the stripper finger of FIGURE 6 taken along lines 7—7.
Figure 8:
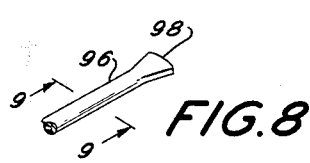
FIGURE 8 is a partial perspective view of still another type of stripper finger which might be utilized in accordance with the principles of the present invention.
Figure 9:
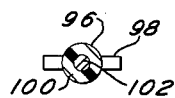
FIGURE 9 is a cross sectional view of the stripper finger of FIGURE 8 taken along lines 9—9.

The stripper finger may be flat as shown in FIGURE 7 or may have a rounded body portion 96 such as is shown in FIGURE 8 to achieve line contact with the material to be transferred. If such a round configuration is desired, the end 98 would be flattened so as to fit easily within the grooves 54–60. The rounded portion 96 would be formed from a wire 102 having a coating 100 formed thereon of polytetrafluorethylene. The wire would not extend to the end or tip 98 which could then be flattened as discussed previously.

Thus, with the conveyor belt system shown in FIGURE 5, material may be transferred from one conveyor belt to another at right angles by utilizing the stripper finger assembly shown. The stripper finger assembly could be banked if desired by varying the position of each stripper finger.

The present invention may be embodied in other specific forms without departing from the spirit or essential attributes thereof and, accordingly, reference should be made to the appended claims, rather than to the foregoing specification as indicating the scope of the invention.

I claim:

1. A conveyor belt system comprising a first and second conveyor belts, each mounted on a rotatable roll, said second conveyor belt being mounted adjacent to and below said first conveyor belt, said first conveyor belt having longitudinal grooves on the outer surface thereof, and a stripper finger assembly adapted to cooperate with the grooves on said first conveyor belt outer surface to strip material from said first conveyor belt and transport it to said second conveyor belt.

2. The conveyor belt system of claim 1 wherein said first conveyor belt has longitudinal grooves on the inner surface thereof, said first conveyor belt roll having peripheral parallel spaced raised portions adapted to interlock with said first conveyor belt inner surface grooves whereby lateral movement of said first conveyor belt with respect to said first roll is eliminated.

3. The conveyor belt system of claim 1 wherein said stripper finger assembly includes a plurality of stripper fingers, said stripper fingers having an inclined plane portion, said inclined plane portion being formed of thin wire aligned with said first conveyor belt outer surface grooves to provide line contact for material passing from said first conveyor belt onto said second conveyor belt.

4. The conveyor belt system of claim 1 wherein said stripper asembly is mounted on a resilient support, said stripper finger assembly being resiliently forced into said first conveyor belt outer surface grooves.

5. The conveyor belt system of claim 3 wherein said inclined plane portion has a closed loop at the end thereof, said closed loop being adapted to fit within said first conveyor belt outer surface grooves to strip material from said first conveyor belt and force it onto said inclined plane portion.

6. The conveyor belt system of claim 1 wherein said stripper finger assembly includes a separate stripper finger for each longitudinal groove on said first conveyor belt outer surface.

7. A conveyor belt system comprising a first and second conveyor belts, said second conveyor belt being mounted at an angle to and below said first conveyor belt, said first conveyor belt having longitudinal grooves on the outer surface thereof, and a stripper finger assembly adapted to cooperate with the grooves on said first conveyor belt outer surface to strip material from a transverse portion of said first conveyor belt and transport it to positions on said second conveyor belt corresponding to the transverse position on the first conveyor belt.

8. The conveyor belt system of claim 7 wherein said stripper finger assembly includes a separate stripper finger for each longitudinal groove on said conveyor belt outer surface, each stripper finger being graduated in length to transport material to the correct transverse position on the second conveyor belt.

9. The stripping mechanism of claim 7 wherein said flexible fingers are formed of a rigid core coated with a substantially frictionless material.

10. The stripping mechanism of claim 9 wherein said coating is polytetrafluorethylene.

11. A conveyor belt system comprising a conveyor belt means including a flat, annular belt having an inner and outer surface, said conveyor belt outer surface having longitudinal grooves running the length thereof, and a stripper finger assembly adapted to cooperate with the grooves on said conveyor belt outer surface, said stripper finger assembly comprising a plurality of L-shaped flexible fingers, said flexible fingers having an end portion adapted to fit within the grooves in said conveyor belt, said flexible fingers additionally having an inclined plane portion for transporting articles from said conveyor belt to another supporting surface.

12. The conveyor belt system of claim 11 wherein said stripper assembly is mounted on a resilient support, said stripper fingers being resiliently forced into separate ones of said conveyor belt outer surface grooves.

13. The conveyor belt system of claim 11 wherein said inclined plane portion has a closed loop at the end thereof, said closed loop being adapted to fit within said conveyor belt outer surface grooves to strip material from said conveyor belt and force it onto said inclined plane portion.

14. A conveyor belt system comprising a conveyor belt, said belt being a flat annular belt having an inner and outer surface, said outer surface having longitudinally extending grooves running the length thereof, a stripper finger assembly for cooperation with the grooves on said outer surface, said assembly including a plurality of flexible fingers, each finger having an end portion extending into a separate one of said grooves, and said fingers having an inclined plane portion for transporting articles from said conveyor belt to another supporting surface.

References Cited by the Examiner

UNITED STATES PATENTS

| 1,962,879 | 6/34 | Schmidt | 198—190 |
| 2,637,458 | 5/53 | Fahey | 198—190 |

FOREIGN PATENTS

| 337,039 | 4/59 | Switzerland. |

SAMUEL F. COLEMAN, *Primary Examiner.*

WILLIAM B. LABORDE, *Examiner.*